(12) United States Patent
Cunico et al.

(10) Patent No.: US 11,210,709 B2
(45) Date of Patent: Dec. 28, 2021

(54) METHODS AND SYSTEMS FOR GENERATING PERSONALIZED CALL-TO-ACTION ELEMENTS

(71) Applicant: INTERNATIONAL BUSINESS MACHINES CORPORATION, Armonk, NY (US)

(72) Inventors: Hernan A. Cunico, Holly Springs, NC (US); Adam Smye-Rumsby, Reading, PA (US); Martin G. Keen, Cary, NC (US); Paul A. R. Frank, Berlin (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 16/014,449

(22) Filed: Jun. 21, 2018

(65) Prior Publication Data

US 2019/0392486 A1    Dec. 26, 2019

(51) Int. Cl.
*G06F 16/9535*    (2019.01)
*G06Q 30/02*    (2012.01)
*G06Q 50/00*    (2012.01)

(52) U.S. Cl.
CPC ..... *G06Q 30/0276* (2013.01); *G06F 16/9535* (2019.01); *G06Q 50/01* (2013.01)

(58) Field of Classification Search
CPC .............. G06Q 30/0276; G06Q 50/01; G06F 16/9535; G06F 17/27
See application file for complete search history.

(56) References Cited

U.S. PATENT DOCUMENTS

| | | | |
|---|---|---|---|
| 8,726,312 B1 | 5/2014 | Hewinson | |
| 9,396,491 B2 * | 7/2016 | Isaacson | G06F 16/248 |
| 10,404,636 B2 * | 9/2019 | Rodriguez | H04L 65/60 |
| 10,643,104 B1 * | 5/2020 | Xue | G06N 20/00 |
| 10,977,745 B1 * | 4/2021 | Chiang | G06Q 40/123 |
| 2016/0179343 A1 * | 6/2016 | Shein | G06F 40/134 |
| | | | 715/760 |
| 2016/0224524 A1 * | 8/2016 | Kay | G06F 3/0236 |
| 2017/0186053 A1 | 6/2017 | Ramakrishnan et al. | |

OTHER PUBLICATIONS

Counterfactural Language Model Adaptation for Suggesting Phrases; Kenneth Arnold, Kai-Wei Chang, Adam Kalai, 2017.*

* cited by examiner

*Primary Examiner* — Victoria E Frunzi
(74) *Attorney, Agent, or Firm* — Griffiths & Seaton PLLC (57) ABSTRACT

Embodiments for managing call-to-action elements by one or more processors are described. User data is received from at least one data source associated with the user. Based on the user data, a label for a call-to-action element to be rendered by a computing node is determined. A signal representative of the determined label for the call-to-action element is generated.

18 Claims, 7 Drawing Sheets

METHODS AND SYSTEMS FOR GENERATING PERSONALIZED CALL-TO-ACTION ELEMENTS

BACKGROUND OF THE INVENTION

Field of the Invention

The present invention relates in general to computing systems, and more particularly, to various embodiments for generating personalized call-to-action (CTA) elements.

Description of the Related Art

Electronic content, such as that displayed on websites and/or through applications, is often accompanied by actionable elements labeled in such a way to entice the viewer (or user) to take some form of action (e.g., "clicking" on the element). For example, a website may display a box or section that can be selected or clicked by the viewer, which may lead to, for example, an article pertaining to related content, a product demonstration, a different web page where a product may be purchased, etc. These elements are sometimes referred to as "call-to-action" (CTA) elements or items (or "calls-to-action" or "call-to-actions").

CTA elements are often static, and thus the same for all viewers. As such, there is a chance that the CTA elements are labeled (or worded) in such a way that may not be appealing to particular viewers. As a result, at least some of the viewers may not choose to take the invited action.

SUMMARY OF THE INVENTION

Various embodiments for managing call-to-action elements by one or more processors are described. In one embodiment, by way of example only, a method for managing call-to-action elements, again by one or more processors, is provided. User data is received from at least one data source associated with the user. Based on the user data, a label for a call-to-action element to be rendered by a computing node is determined. A signal representative of the determined label for the call-to-action element is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, electronic content, such as that displayed on websites and/or through applications, is often accompanied by actionable elements, items, or sections labeled in such a way to entice the viewer (or user) to take some form of action (e.g., "clicking" on the element). For example, a website may display a box or section that can be selected or clicked by the viewer, which may lead to, for example, an article pertaining to related content, a product demonstration, a different web page where a product may be purchased, etc.

These elements are sometimes referred to as "call-to-action" (CTA) elements (or "calls-to-action" or "call-to-actions"). CTA element labels often include phrases such as "You might also like," "Sign up for free," "View pricing and buy," "Start your free trial," "Learn more," etc. There is considerable effort invested in choosing the most effective phrasing for the labels, as marketing agencies, user experience (UX) designers, information architects, content authors, etc. strive to create catchy, engaging labels for maximizing viewer engagement with CTA elements.

One of the problems involved is that it is a manual process, and once defined and implemented, those terms/labels typically remain static. "AB testing" may be used to determine comparable performance between two choices of phrasing, but still, it is a manual process. Another problem is that the label of choice is typically the same for all viewers.

Yet another problem is changing context and the potential for a label to become "poorly worded." For example, a user may be reading an article about his/her favorite sports teaming winning their respective championship on a new-related website and scroll down the page to continue reading. At the end of the article (and/or at the bottom of the web page), there may be a CTA element with a label that includes the phrase "You may also like," which leads to a new story about recent tragedy (e.g., on the same website or a different website). In such an example, given the subject matter of the linked story, the phrasing of the label may be deemed to be in poor taste, and the odds that the viewer clicks/follows the CTA element may be decreased. In other words, considering the subject matter of the linked story and/or the sentiment of the viewer, a different label on the CTA element may have been more appropriate and improved the likelihood that the viewer took the action suggested by the CTA element.

To address these needs, some embodiments described herein provide methods and systems for a cognitive solution for generating personalized CTA elements, or more specifically, CTA element labels (and/or titles) for individual viewers (or users), that take into consideration context as well as viewer style and preferences, thus maximizing the performance or engagement of the CTA element(s). As such, some embodiments described herein provide a user-specific solution for determining most effective wording for CTA element labels and an association of user specific idioms to user preferences to personalize online content.

Embodiments described herein may analyze user (or viewer) behavior based on data associated with the user that is received (or retrieved) from multiple data sources (e.g., online data sources, such as social media activity, emails, searches, etc.). For example, the user's behavior and/or preferences with respect to vocabulary and terms of speech may be determined. Using such, a user-specific model may be created with, for example, key words, key phrases, definitions, etc. that are of special significance to that user. Online (e.g., Internet, web, etc.) content visited (or viewed or rendered) by the user, along with the context of such visits (e.g., recent current events at the time), may be analyzed. When the user subsequently views content (e.g., online and/or through an application), CTA elements (and/or the labels thereof) may be identified and compared to, for example, the user's model. The CTA elements may be modified by, for example, changing the CTA label(s) to include the appropriate (or "best") words, phrases, etc. as determined for that user based on his/her model and/or the context of the viewing. Alternatively, CTA elements may be created with such labels.

According to some embodiments described herein, a cognitive analysis is utilized on various types of data sources associated with the user. For example, the cognitive analysis may include classifying natural language, analyzing tone, and analyzing sentiment (e.g., scanning for keywords, key phrases, etc.), as is commonly understood. In some embodiments, feedback may be provided to the system regarding, for example, the effectiveness of the personalized CTA labels. For example, whether or not the user interacts with the CTA elements may be tracked or monitored and/or the user may be provided with inquiries and explicitly provide feedback (e.g., via electronic communications). The methods and systems described herein may utilize feedback to tune and/or make changes to the changing and/or creating CTA labels (e.g., for the same user and/or other users).

As such, in some embodiments, the methods and/or systems described herein may utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the changing and/or creation of CTA elements (or the labels thereof) and the user's response to/interaction with the CTA elements, as described herein. Utilizing the models, the performance (or operation) of the system (e.g., utilizing/ based on new inputs) may be predicted and/or the performance of the system may be optimized by investigating how changes in the input(s) effect the output(s).

In particular, in some embodiments, a method, by one or more processors, for managing call-to-action elements is provided. User data is received from at least one data source associated with the user. Based on the user data, a label for a call-to-action element to be rendered by a computing node is determined. A signal representative of the determined label for the call-to-action element is generated.

The call-to-action element may be caused to be rendered with the determined label by the computing node. The computing node may include a computing device, an application, or a combination thereof.

The determined label for the call-to-action element may include alphanumeric characters. The at least one data source associated with the user may include at least one of social media activity, electronic communications, or a combination thereof.

The computing node may include a web browser. The call-to-action element may be received from a website. The call-to-action element may be modified based on the determined label before causing the call-to-action element to be rendered. The call-to-action element may be received from a first website, and the call-to-action element may be associated with a second website.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
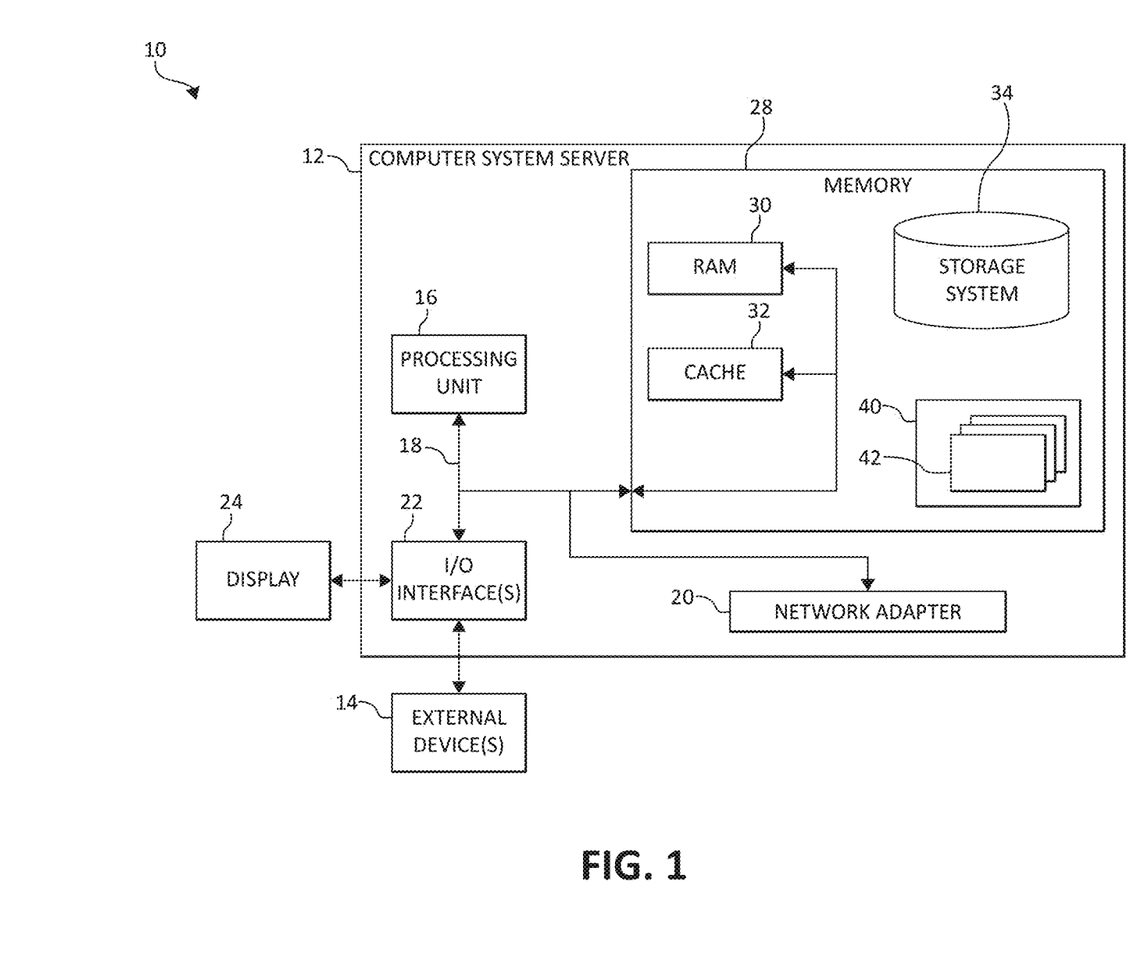
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
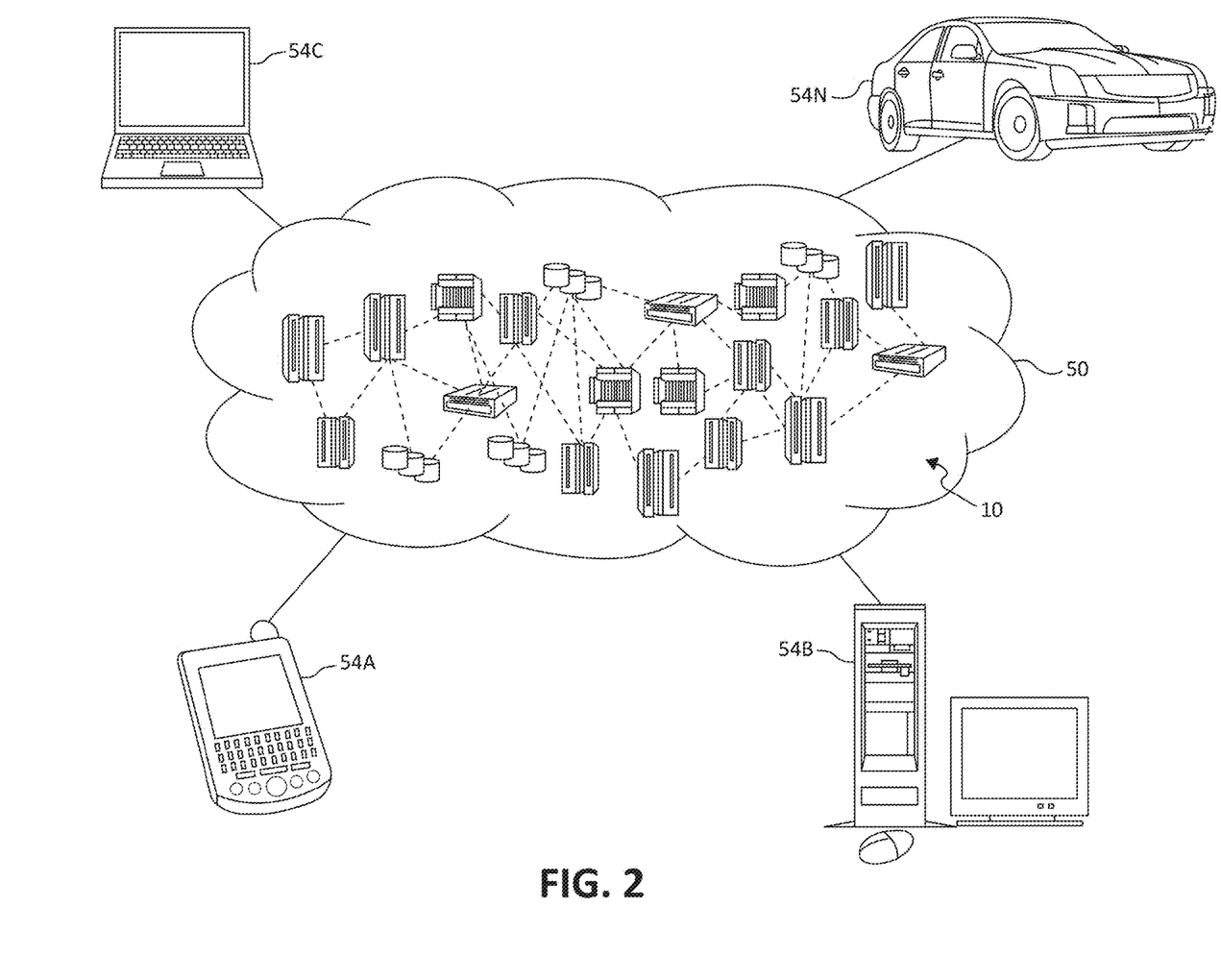
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
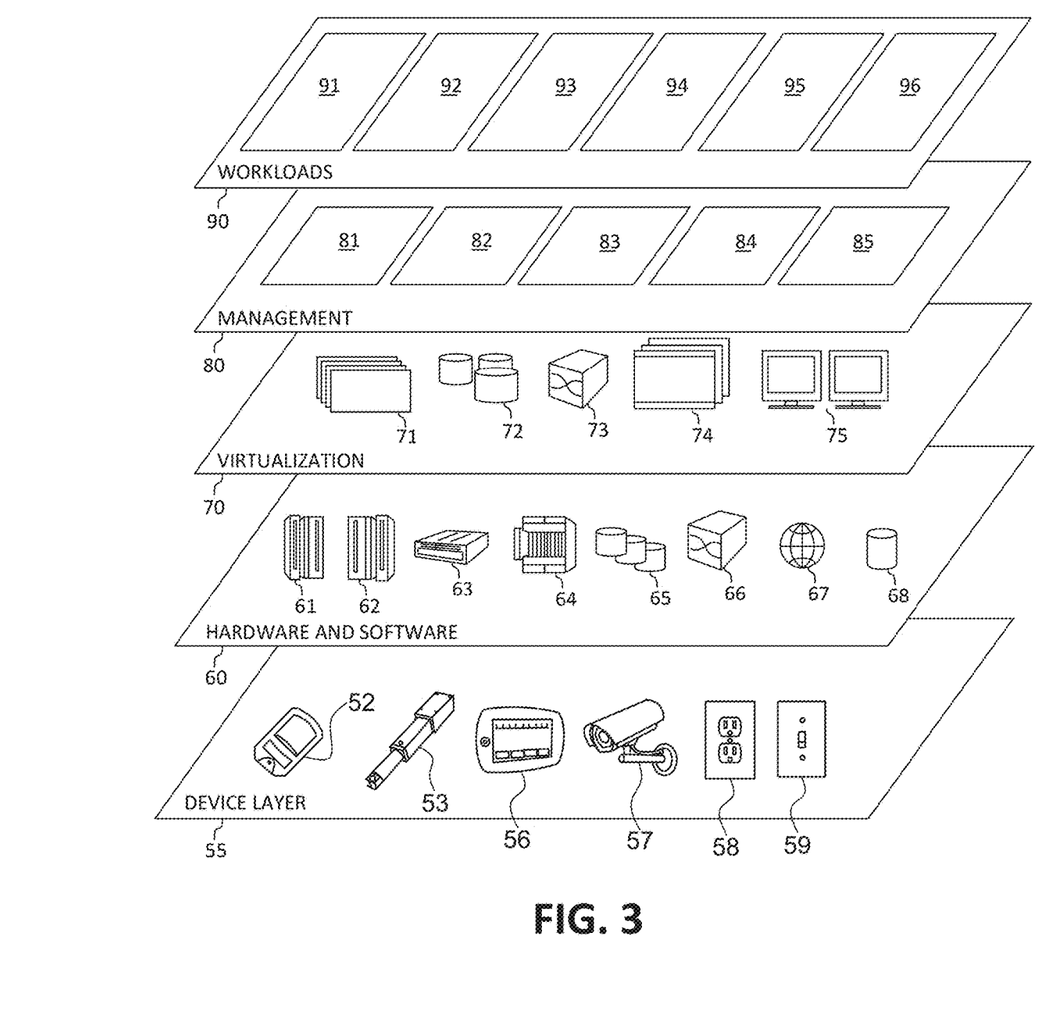
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for changing and/or creating CTA elements and/or CTA element labels as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described above, some embodiments described herein provide methods and systems for generating personalized CTA elements and/or the labels thereof. In some embodiments, user (or viewer) behavior is analyzed using data associated with the user that is received (or retrieved) from multiple data sources (e.g., online data sources, such as social media activity, emails, searches, etc.). For example, the user's behavior and/or preferences with respect to vocabulary and terms of speech may be determined. Using such, a user-specific model may be created with, for example, key words, key phrases, definitions, etc. that are of special significance to that user. Online (e.g., Internet, web, etc.) content visited (or viewed or rendered) by the user, along with the context of such visits (e.g., recent current events at the time), may be analyzed. When the user subsequently views content (e.g., online and/or through an application), CTA elements (and/or the labels thereof) may be identified and compared to, for example, the user's model. The CTA elements may be modified by, for example, changing the CTA label(s) to include the appropriate (or "best") words, phrases, etc. as determined for that user based on his/her model and/or the context of the viewing. Alternatively, CTA elements may be initially created with such labels.

Figure 4:
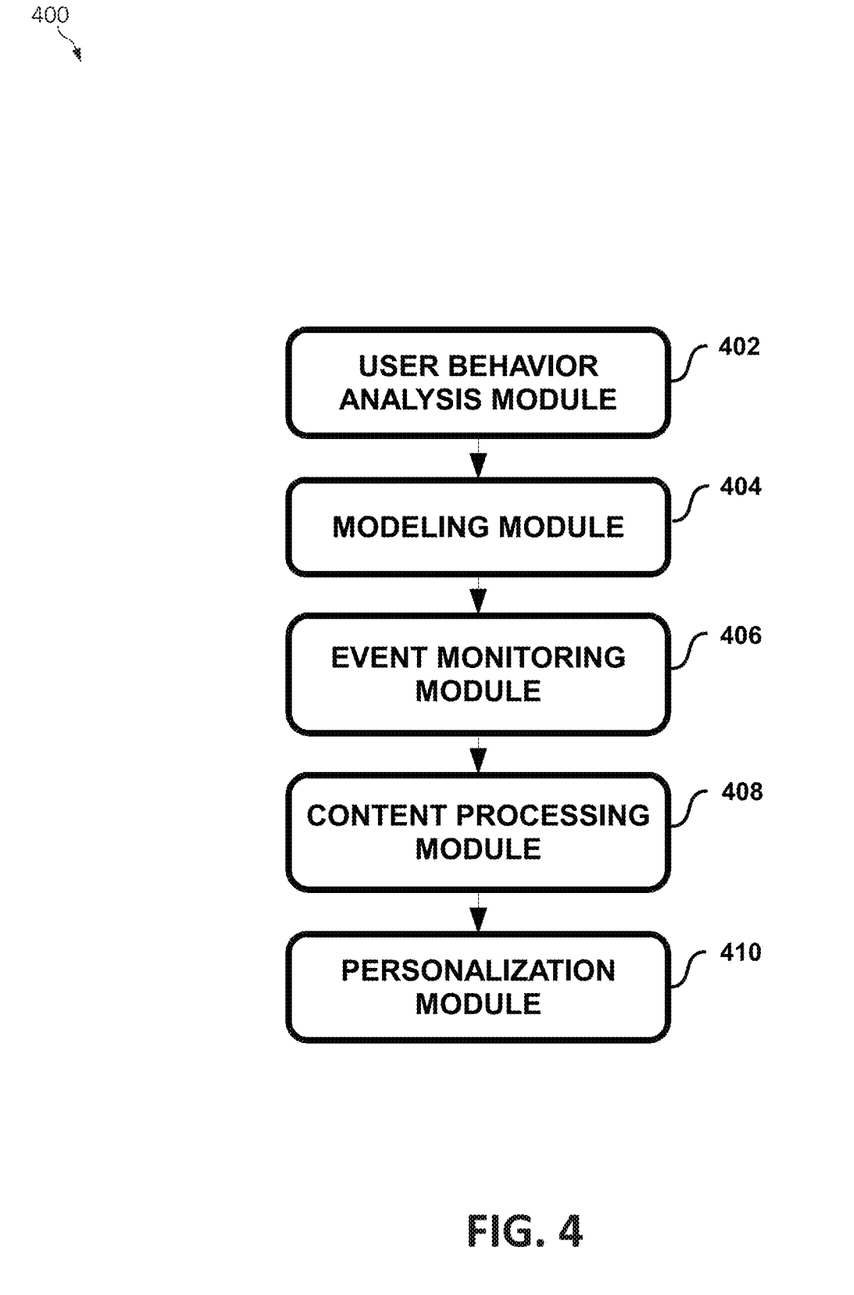
FIG. 4 is a flowchart/block diagram of a system for managing call-to-action (CTA) elements according to an embodiment of the present invention.

FIG. 4 illustrates a system 400 for generating (or modifying) CTA elements according to some embodiments described herein. The system 400 includes a user behavior analysis module 402, a modeling module 404, an event monitoring module 406, a content processing module 408, and a personalization module 410. The system 400 may be implemented using any of the computing systems/devices described above, and although modules 402-410 are shown as separate components, it should be understood that at least some of the modules 402-410 may be integrated into a single computing node, such as a computing device (e.g., a mobile electronic device, a desktop PC, etc.), a software application (e.g., a web browser), or a combination thereof (e.g., a software application on a computing device). In some embodiments, an application or application extension may be installed on a computing device (e.g., a device belonging and/or registered to the user) may be utilized to perform the methods described herein.

In some embodiments, the user behavior analysis module (or behavior module) 402 monitors and/or analyzes the behavior and/or activity of the user to, for example, construct a "baseline" of the user (e.g., a training stage). For example, generally, the behavior module 402 may monitor and/or collect (or receive) various types of data from various data sources (e.g., online data sources) associated with the user. For example, the behavior module 402 may monitor the communication style of the user by identifying the types of words/language used in various types of communications, such as online messaging/chats, text messaging, email, social media activity, reviews/feedback available on various platforms (e.g., e-commerce websites), as well as track the context of those communications (e.g., work-related, personal, etc.). The terms used when performing searches (e.g., Internet/web searches) may also be monitored (and/or collected, received, etc.), as may the online content viewed by the user (e.g., websites visited, the content/subjects of those websites, etc.). The type of content viewed and/or interacted with on particular websites may also be monitored (e.g., to further specify the user's interests). A sentiment analysis may be used to gauge user reaction to titles, labels, etc. of various types of content (e.g., websites). Additionally, the labels (and/or the wording, phrasing, etc.) of CTA elements interacted with versus those of the CTA elements ignored may be tracked.

In some embodiments, the modeling module 404 creates a model of the user with special focus on preferred words and the context where they are used (e.g., as collected/retrieved by the behavior module 402). The system (e.g., the modeling module 404) may also retrieve definitions for those terms, which may be used to better situate the terms when replacing CTA element labels and/or creating CTA elements.

In some embodiment, the event monitoring module 406 performs "social listening" and monitors appropriate data sources (e.g., news-related websites, data streams, etc.) of information about current events. The event monitoring module 406 may assist the system in understanding situational conditions that might have an impact on the model created by the modeling module and temporarily flag data when appropriate.

In some embodiments, the content processing (or analysis) module 408 analyzes the content visited by the user and identifies sections that may be personalized (e.g., CTA elements, titles, headers, etc.). It should be noted that this may apply not only to websites but also applications utilized/accessed by the user. It should also be noted that at this stage, in some embodiments, the user's behavior has already been analyzed and a model for the user has already been created. Using that model, the baseline/model for the user is compared to newly visited sites or newly opened/utilized applications. For example, when the user visits/views a new website (or re-visits a previously visited website) and/or opens a new application (or re-opens a previously used application), the content processing module 408 may analyze the type of content accessed by the user, validate the context to determine whether it is personal or work-related content, and identify CTA elements and labels/titles that match the criteria defined in the model.

In some embodiments, the personalization module (or content personalization module) 410 replaces portions of the sections identified by the content processing module 408 accordingly to the preferences determined in the model produced by the modeling module 404. For example, the personalization module 410 may retrieve the sections (e.g., CTA elements) identified by the content processing module 408, as well as definitions for the CTA elements and titles/labels, and compare the definitions against those from the model created by the modeling module 404. The definitions may be matched to preferred terms for the user and replace the titles/labels with the new terms. In other words, the personalization module 410 (and/or the system 400 as a whole) may replace labels for identified CTA elements with new labels based on the data and/or model associated with the user.

Figure 5:
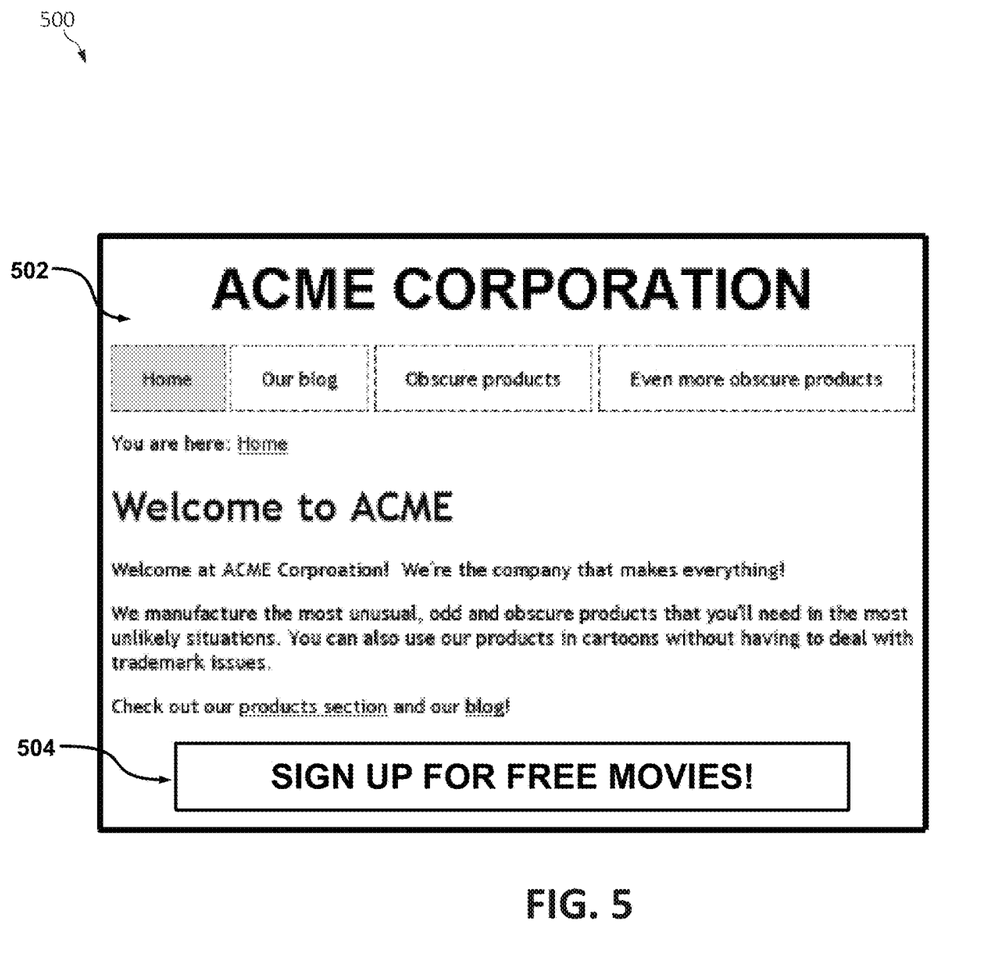
FIGS. 5 and 6 are plan views of a display device rendering a website with a CTA element according to some embodiments of the present invention.
Figure 6:
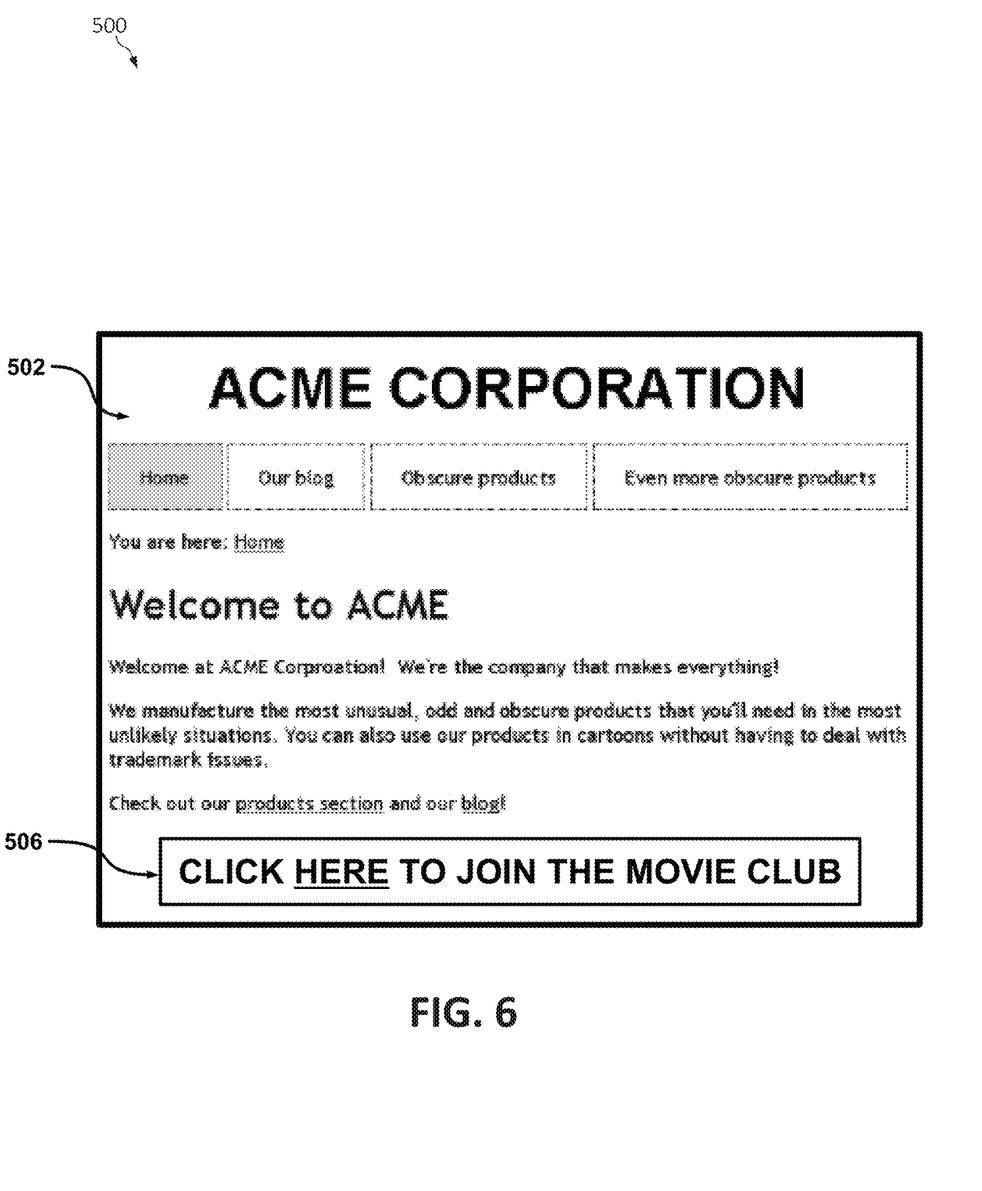

Referring now to FIGS. 5 and 6, a display device (or display screen) 500 of a computing device (e.g., mobile electronic device, desktop PC, etc.) is shown rendering a website 502. As shown in FIG. 5, the website 502 includes (or is rendered with) a CTA element 504, labeled with "Sign up for free movies!" (e.g., linked to or associated with a second website, associated with streaming movies online). The CTA element 504 may be a CTA element with a label that has been created utilizing the systems and methods described herein. That is, the data associated with the user and/or the model created for the user may indicate that he/she has a tendency to interact with CTA elements that include the word "free," and as such, the label for the CTA element 504 has been phrased utilizing that word.

Alternatively, the CTA element 504 may be considered to a "standard" (or first) CTA element associated with the website 502. That is, the CTA element 504 may be considered to be a CTA element with a label that has not been changed or modified based on any data and/or model associated with a user. However, the systems and methods described herein may be utilized to recognize, for example, that the particular user is not likely to interact with CTA elements that are labeled with the word "free" based on the data and/or model associated with the user (e.g., the user may consider the word "free" to indicate that the associated benefit is not worth his/her time or effort). Referring now to FIG. 6, the CTA element has been changed or modified (e.g., before being rendered on the display device 500) to a second CTA element 506, labeled with "Click here to join the movie club." The new CTA label may be created based on the data collected about the user and/or the model created for the user, as described above.

Figure 7:
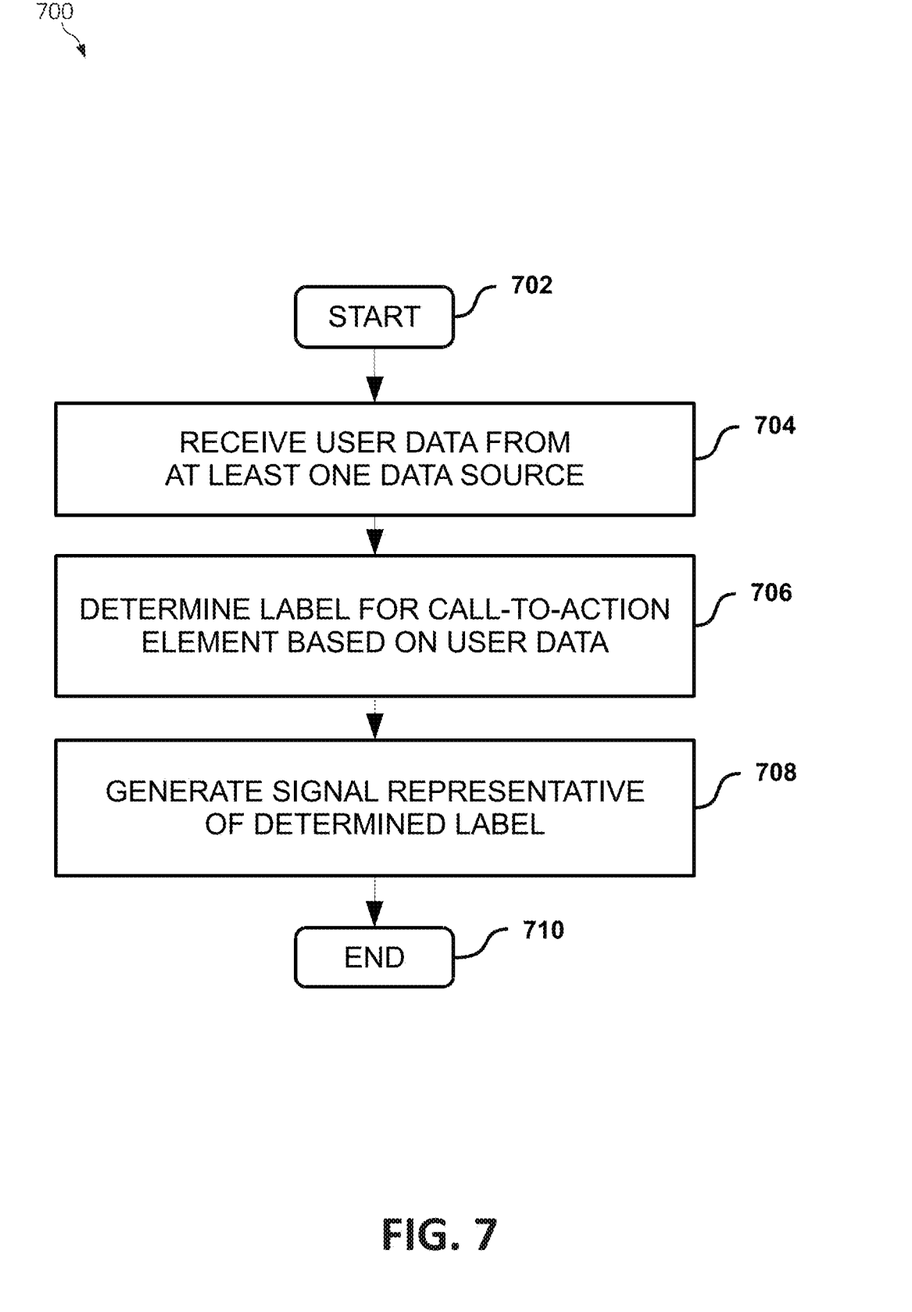
FIG. 7 is a flowchart diagram of an exemplary method for managing CTA elements according to an embodiment of the present invention.

Turning to FIG. 7, a flowchart diagram of an exemplary method 700 for managing CTA elements, or more particularly, personalizing CTA elements for particular users, according to some embodiments described herein, is provided. Method 700 begins (step 702) with, for example, a software application or application extension being installed on a computing node associated with a user. The user may be an individual or a group of individuals who utilize the computing node. The computing node may include a computing device, an application, or a combination thereof.

User data is received (or collected or retrieved) from at least one data source associated with the user (step 704). The at least one data source associated with the user may include at least one of social media activity, electronic communications, or a combination thereof.

Based on the user data, a label for a CTA element to be rendered by the computing node is determined (step 706). The determined label for the CTA element may include alphanumeric characters.

A signal representative of the determined label for the CTA element is generated (step 708). For example, the CTA element may be caused to be rendered with the determined label by the computing node. The computing node may include a web browser. The CTA element may be received from a website and modified based on the determined label before causing the CTA element to be rendered. The CTA element may be received from a first website, and the CTA element may be associated with a second website.

Method 700 ends (step 710) with, for example, feedback being received regarding the effectiveness of the modified or personalized CTA label. For example, whether or not the user interacts with the CTA may be tracked or monitored and/or the user may be provided with inquiries and thereby provide activity input (e.g., via electronic communications). The feedback may be utilized to tune and/or make changes to the changing and/or creating CTA labels (e.g., for the same user and/or other users).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing call-to-action elements comprising:
   receiving passively collected user data from at least one data source associated with the user, wherein passively collecting the user data includes monitoring content consumed and provided by the user to the at least one data source during multiple online sessions the user is engaged in;
   training a machine learning model using the received user data, wherein the machine learning model performs a semantic analysis of communication behavior of the user as contained in the received user data to determine a vocabulary and phrasing of text preferred by the user;
   based on the semantic analysis of the user data, determining descriptive phrasing to be displayed on a label for a call-to-action element to be rendered by a computing node, wherein the label is generated in response to performing the semantic analysis according to the trained machine learning model such that the descriptive phrasing displayed on the label of the call-to-action element is customized to the user based on the semantic analysis; and
   causing the call-to-action element to be rendered with the determined descriptive phrasing displayed on the label by the computing node, wherein causing the call-to-action element to be rendered includes replacing default text of the descriptive phrasing displayed on the label with modified text generated according to the vocabulary and phrasing of text preferred by the user.

2. The method of claim 1, wherein the computing node includes a computing device, an application, or a combination thereof.

3. The method of claim 1, wherein the determined descriptive phrasing displayed on the label for the call-to-action element includes alphanumeric characters.

4. The method of claim 1, wherein the at least one data source associated with the user includes at least one of social media activity, electronic communications, or a combination thereof.

5. The method of claim 2, wherein the computing node includes a web browser, and further includes:
   receiving the call-to-action element from a website; and
   modifying the call-to-action element based on the determined descriptive phrasing displayed on the label before causing the call-to-action element to be rendered.

6. The method of claim 2, wherein the computing node includes a web browser, the call-to-action element is received from a first website, and the call-to-action element is associated with a second website.

7. A system for managing call-to-action elements comprising:
   at least one processor that
      receives passively collected user data from at least one data source associated with the user, wherein passively collecting the user data includes monitoring content consumed and provided by the user to the at least one data source during multiple online sessions the user is engaged in;
      trains a machine learning model using the received user data, wherein the machine learning model performs a semantic analysis of communication behavior of the user as contained in the received user data to determine a vocabulary and phrasing of text preferred by the user;
      based on the semantic analysis of the user data, determines descriptive phrasing to be displayed on a label for a call-to-action element to be rendered by a computing node, wherein the label is generated in response to performing the semantic analysis according to the trained machine learning model such that the descriptive phrasing displayed on the label of the call-to-action element is customized to the user based on the semantic analysis; and
      causes the call-to-action element to be rendered with the determined descriptive phrasing displayed on the label by the computing node, wherein causing the call-to-action element to be rendered includes replacing default text of the descriptive phrasing displayed on the label with modified text generated according to the vocabulary and phrasing of text preferred by the user.

8. The system of claim 7, wherein the computing node includes a computing device, an application, or a combination thereof.

9. The system of claim 7, wherein the determined descriptive phrasing displayed on the label for the call-to-action element includes alphanumeric characters.

10. The system of claim 7, wherein the at least one data source associated with the user includes at least one of social media activity, electronic communications, or a combination thereof.

11. The system of claim 8, wherein the computing node includes a web browser, and wherein the at least one processor further:
receives the call-to-action element from a website; and
modifies the call-to-action element based on the determined descriptive phrasing displayed on the label before causing the call-to-action element to be rendered.

12. The system of claim 8, wherein the computing node includes a web browser, the call-to-action element is received from a first website, and the call-to-action element is associated with a second website.

13. A computer program product for managing call-to-action elements by one or more processors, the computer program product comprising a non-transitory computer-readable storage medium having computer-readable program code portions stored therein, the computer-readable program code portions comprising:
an executable portion that receives passively collected user data from at least one data source associated with the user, wherein passively collecting the user data includes monitoring content consumed and provided by the user to the at least one data source during multiple online sessions the user is engaged in;
an executable portion that trains a machine learning model using the received user data, wherein the machine learning model performs a semantic analysis of communication behavior of the user as contained in the received user data;
an executable portion that, based on the semantic analysis of the user data, determines descriptive phrasing to be displayed on a label for a call-to-action element to be rendered by a computing node, wherein the label is generated in response to performing the semantic analysis according to the trained machine learning model such that the descriptive phrasing displayed on the label of the call-to-action element is customized to the user based on the semantic analysis; and
an executable portion that causes the call-to-action element to be rendered with the determined descriptive phrasing displayed on the label by the computing node, wherein causing the call-to-action element to be rendered includes replacing default text of the descriptive phrasing displayed on the label with modified text generated according to the vocabulary and phrasing of text preferred by the user.

14. The computer program product of claim 13, wherein the computing node includes a computing device, an application, or a combination thereof.

15. The computer program product of claim 13, wherein the determined descriptive phrasing displayed on the label for the call-to-action element includes alphanumeric characters.

16. The computer program product of claim 13, wherein the at least one data source associated with the potential customer includes at least one of social media activity, electronic communications, or a combination thereof.

17. The computer program product of claim 14, wherein the computing node includes a web browser, and wherein the computer-readable program code portions further include:
an executable portion that receives the call-to-action element from a website; and
an executable portion that modifies the call-to-action element based on the determined descriptive phrasing displayed on the label before causing the call-to-action element to be rendered.

18. The computer program product of claim 14, wherein the computing node includes a web browser, the call-to-action element is received from a first website, and the call-to-action element is associated with a second website.

* * * * *